US009038465B2

(12) United States Patent
Chun

(10) Patent No.: US 9,038,465 B2
(45) Date of Patent: May 26, 2015

(54) METHOD OF SETTING VALID OUTPUT SECTIONS OF 2-AXIS ACCELERATION SENSOR OR 3-AXIS ACCELERATION SENSOR

(75) Inventor: Jae Hyung Chun, Gyeonggi-do (KR)

(73) Assignee: MANDO CORPORATION, Pyeongtaek-Si, Gyeonggi-Do (KR)

(*) Notice: Subject to any disclaimer, the term of this patent is extended or adjusted under 35 U.S.C. 154(b) by 308 days.

(21) Appl. No.: 13/482,833

(22) Filed: May 29, 2012

(65) Prior Publication Data
US 2013/0047725 A1 Feb. 28, 2013

(30) Foreign Application Priority Data
Aug. 29, 2011 (KR) ........................ 10-2011-0086244

(51) Int. Cl.
G01P 15/00 (2006.01)
G01M 17/02 (2006.01)
G01P 21/00 (2006.01)

(52) U.S. Cl.
CPC ................ G01P 21/00 (2013.01); G01P 15/00 (2013.01)

(58) Field of Classification Search
USPC ........ 73/510, 511, 146, 514.01; 702/141, 158
See application file for complete search history.

(56) References Cited

U.S. PATENT DOCUMENTS

| | | | | |
|---|---|---|---|---|
| 4,908,767 A | * | 3/1990 | Scholl et al. | .................. 701/505 |
| 5,749,984 A | * | 5/1998 | Frey et al. | ..................... 152/415 |
| 5,877,679 A | * | 3/1999 | Prottey | ......................... 340/442 |
| 6,466,887 B1 | * | 10/2002 | Weinbrenner | ................. 702/141 |
| 6,856,884 B2 | * | 2/2005 | Traylor | ............................ 701/70 |
| 6,940,940 B2 | * | 9/2005 | Kranz | ........................... 377/24.1 |
| 8,005,592 B2 | * | 8/2011 | Lu | ..................... 701/38 |
| 8,352,210 B2 | * | 1/2013 | Kranz | ........................... 702/141 |
| 2003/0058118 A1 | | 3/2003 | Wilson | |
| 2005/0229720 A1 | * | 10/2005 | Hanazawa et al. | ....... 73/862.042 |
| 2008/0015763 A1 | | 1/2008 | Kitazaki et al. | |
| 2009/0171531 A1 | | 7/2009 | Kitazaki et al. | |
| 2009/0293602 A1 | | 12/2009 | Gotschlich | |

FOREIGN PATENT DOCUMENTS

JP 2004-102753 4/2004
JP 2006-153832 6/2006

OTHER PUBLICATIONS

German Office Action issued in German Patent Application No. 10 2012 209 015.0 dated Aug. 1, 2013.

* cited by examiner

Primary Examiner — Helen Kwok
(74) Attorney, Agent, or Firm — McDermott Will & Emery LLP

(57) ABSTRACT

Disclosed herein is a method of setting valid output sections of a 3-axis acceleration sensor mounted within a tire of a vehicle, including setting an output signal of the 3-axis acceleration sensor in the z-axis direction as a reference signal, setting a specific section of the output signal in the z-axis direction as a valid section where a part of the tire where the 3-axis acceleration sensor is mounted contacts a road surface, and setting sections of output signals of the 3-axis acceleration sensor in the x-axis and y-axis directions corresponding to the valid section in the z-axis direction as valid sections in the x-axis and y-axis directions. The method sets precise valid sections applied to detect information between the tire and a ground surface so as to minimize a component of a noise section by connecting output signals in the x-axis, y-axis and z-axis directions.

4 Claims, 4 Drawing Sheets

METHOD OF SETTING VALID OUTPUT SECTIONS OF 2-AXIS ACCELERATION SENSOR OR 3-AXIS ACCELERATION SENSOR

CROSS-REFERENCE TO RELATED APPLICATION

This application claims the benefit of Korean Patent Application No. 2011-0086244, filed on Aug. 29, 2011 in the Korean Intellectual Property Office, the disclosure of which is incorporated herein by reference.

BACKGROUND

1. Field

Embodiments of the present invention relate to a method of setting valid output sections of a 2-axis acceleration sensor or a 3-axis acceleration sensor which sets precise valid sections applied to detect information between a tire and a ground surface from output signals from a multi-axis (2-axis or 3-axis) acceleration sensor mounted within the tire.

2. Description of the Related Art

In general, an acceleration sensor means a device which measures dynamic force, such as acceleration, vibration, impact, etc. of an object, by processing an output signal. Such an acceleration sensor may precisely sense the moving state of the object, and thus an application range thereof is increasingly widened for various purposes. The acceleration sensor is essential in various transport units, such as vehicles (automobiles), ships, airplanes, etc., factory automation systems and control systems of robots.

Particularly, a 3-axis acceleration sensor is used in a vehicle collision test and an air bag development test. In order to obtain a desired test result from a vehicle in such tests, a test process is commonly repeated several hundred times or more.

Further, the 3-axis acceleration sensor used in these tests is a sensor to simultaneously measure accelerations varied in the x-axis, y-axis and z-axis directions, i.e., to obtain rates of change of velocity for the respective axes. Here, the measured acceleration is a value obtained by dividing change of velocity by unit time, i.e., means change of the velocity of a moving object per unit time, and the acceleration sensor changes a quantity of a motion, such as the velocity, the acceleration, etc. of a moving object, into a constant value (voltage), thereby serving to measure the velocity, the acceleration, etc.

Therefore, acceleration sensors have been widely used in a vibration test and a durability test of an object, a fatigue test, a collision test, an air bag development test and various other fields, and thus science technology development is not expected without acceleration sensors.

In general, a 3-axis acceleration sensor is attached to a rotating wheel to measure the acceleration of the wheel, and vibration or shaking of the wheel is tested using the measured value. As acceleration sensors, a wired type and a wireless type are used, and the wireless type is very expensive and thus the wired type is most commonly used.

If a multi-axis (3-axis) acceleration sensor is mounted within a tire, when impact from the outside is applied to the tire, the acceleration sensor outputs a result, and information between the tire and the ground surface is judged from output characteristics represented when the part of the tire where the acceleration sensor is mounted contacts the road surface. Due to characteristics in which the multi-axis acceleration sensor is mounted within the tire, the information between the tire and the ground surface may be precisely detected when external input (impact) is continuously applied to the tire during driving of a vehicle and external input applied from other regions than the ground surface is treated as a noise component.

Conventionally, a method in which information of a tire and a ground surface is judged respectively using output characteristics of the 3-axis acceleration sensor in the x-axis, y-axis and z-axis directions is applied. However, when the 3-axis acceleration sensor is applied to an actual test, a severe noise component is added to an output signal of the acceleration sensor, and thus it may be difficult to detect valid output sections of the sensor respectively using the output characteristics of the sensor in the x-axis, y-axis and z-axis directions.

SUMMARY

Therefore, it is an aspect of the present invention to provide a method of setting valid output sections of a 2-axis acceleration sensor or a 3-axis acceleration sensor which sets precise valid sections applied to detect information between a tire and a ground surface so as to minimize a component of a noise section by connecting output signals of the acceleration sensor in the x-axis, y-axis and z-axis directions.

Additional aspects of the invention will be set forth in part in the description which follows and, in part, will be obvious from the description, or may be learned by practice of the invention.

In accordance with one aspect of the present invention, a method of setting a valid output section of a 3-axis acceleration sensor mounted within a tire of a vehicle to measure accelerations in the x-axis, y-axis and z-axis directions, including setting an output signal of the 3-axis acceleration sensor in the z-axis direction as a reference signal, setting a specific section of the output signal in the z-axis direction as a valid section where a part of the tire where the 3-axis acceleration sensor is mounted contacts a road surface, and setting sections of output signals of the 3-axis acceleration sensor in the x-axis and y-axis directions corresponding to the valid section in the z-axis direction as valid sections in the x-axis and y-axis directions.

The specific section of the output signal in the z-axis direction may be a section where a positive (+) peak value, a negative (−) peak value and a positive (+) peak value of the output signal in the z-axis direction are represented.

The method may further include detecting information of the tire and the ground surface by processing signals only in the set valid sections in the x-axis, y-axis and the z-axis directions.

In accordance with another aspect of the present invention, a method of setting valid output sections of a 2-axis acceleration sensor mounted within a tire of a vehicle to measure accelerations in the x-axis and z-axis directions, including setting an output signal of the 2-axis acceleration sensor in the z-axis direction as a reference signal, setting a specific section of the output signal in the z-axis direction as a valid section where a part of the tire where the 2-axis acceleration sensor is mounted contacts a road surface, and setting a section of an output signal of the 2-axis acceleration sensor in the x-axis direction corresponding to the valid section in the z-axis direction as a valid section in the x-axis direction.

The specific section of the output signal in the z-axis direction may be a section where a positive (+) peak value, a negative (−) peak value and a positive (+) peak value of the output signal in the z-axis direction are represented.

The method may further include detecting information of the tire and the ground surface by processing signals only in the set valid sections in the x-axis and z-axis directions.

In accordance with a further aspect of the present invention, a method of setting valid output sections of a 2-axis acceleration sensor mounted within a tire of a vehicle to measure accelerations in the y-axis and z-axis directions, including setting an output signal of the 2-axis acceleration sensor in the z-axis direction as a reference signal, setting a specific section of the output signal in the z-axis direction as a valid section where a part of the tire where the 2-axis acceleration sensor is mounted contacts a road surface, and setting a section of an output signal of the 2-axis acceleration sensor in the y-axis direction corresponding to the valid section in the z-axis direction as a valid section in the y-axis direction.

The specific section of the output signal in the z-axis direction may be a section where a positive (+) peak value, a negative (−) peak value and a positive (+) peak value of the output signal in the z-axis are represented.

The method may further include detecting information of the tire and the ground surface by processing signals only in the set valid sections in the y-axis and z-axis directions.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1A:
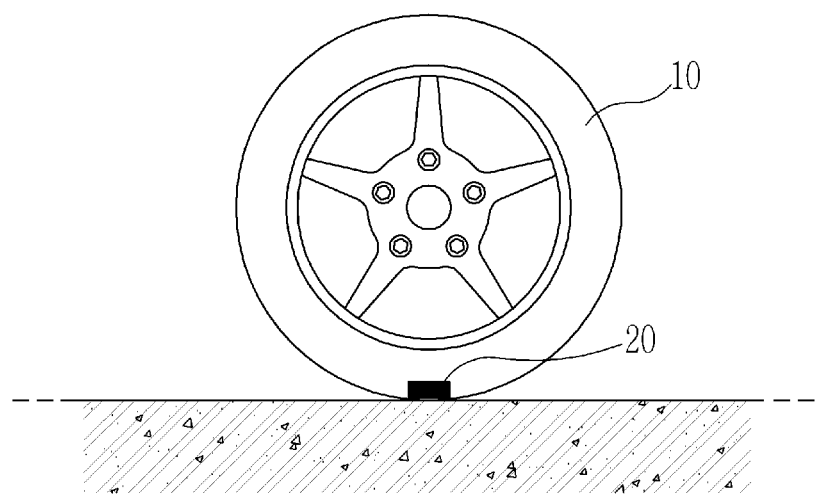
FIG. 1A is a view illustrating mounting of a multi-axis acceleration sensor within a tire.

Reference will now be made in detail to the embodiments of the present invention, examples of which are illustrated in the accompanying drawings, wherein like reference numerals refer to like elements throughout.

FIG. 1A is a view illustrating mounting of a multi-axis acceleration sensor within a tire.

As shown in FIG. 1A, a multi-axis acceleration sensor 20 is mounted within a tire 10 of a vehicle. Here, as the multi-axis acceleration sensor 20, a 2-axis acceleration sensor or a 3-axis acceleration sensor including an axis arranged in a vertical direction may be used.

Particularly, the 3-axis acceleration sensor is a sensor to simultaneously measure accelerations varied in the x-axis, y-axis and z-axis directions, i.e., to obtain rates of change of velocity for the respective axes. Here, the measured acceleration is a value obtained by dividing change of velocity by unit time, i.e., means change of the velocity of a moving object per unit time, and the acceleration sensor changes a quantity of a motion, such as the velocity, the acceleration, etc. of a moving object, into a constant value (voltage), thereby serving to measure the velocity, the acceleration, etc.

Figure 1B:
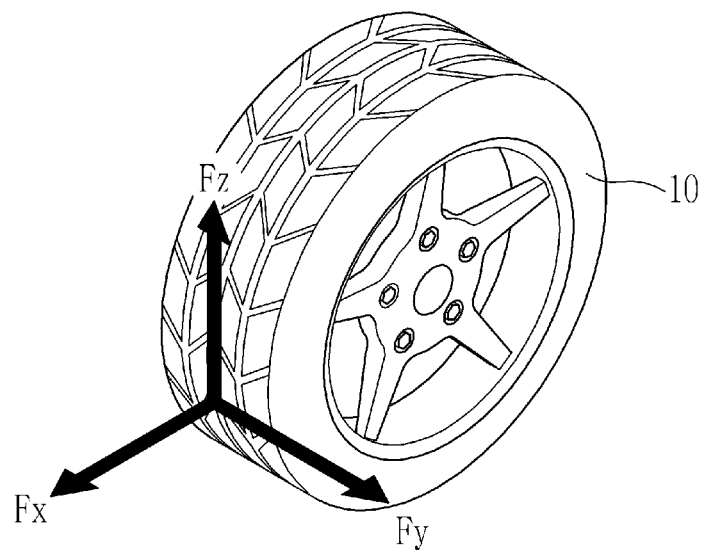
FIG. 1B is a view illustrating directions of force applied to the tire.

FIG. 1B is a view illustrating directions of force applied to the tire.

External input (impact) is continuously applied to the tire during driving of the vehicle. As shown in FIG. 1B, force Fx in the longitudinal direction (the x-axis direction), force Fy in the transversal direction (the y-axis direction) and force Fz in the vertical direction (the z-axis direction) are applied to the tire 10. Here, the 3-axis acceleration sensor 20 mounted within the tire 10 serves to measure longitudinal acceleration applied in the x-axis direction, transversal acceleration applied in the y-axis direction and vertical acceleration applied in the z-axis direction.

The longitudinal acceleration applied in the x-axis direction, the transversal acceleration applied in the y-axis direction and the vertical acceleration applied in the z-axis direction, detected by the 3-axis acceleration sensor 20, is supplied to an electronic controller (not shown), and the electronic controller detects information between the tire 10 and a ground surface using the detected information of the 3-axis acceleration sensor 20 in the respective directions (the longitudinal acceleration applied in the x-axis direction: ax, the transversal acceleration applied in the y-axis direction: ay, and the vertical acceleration applied in the z-axis direction: az).

Figure 2:
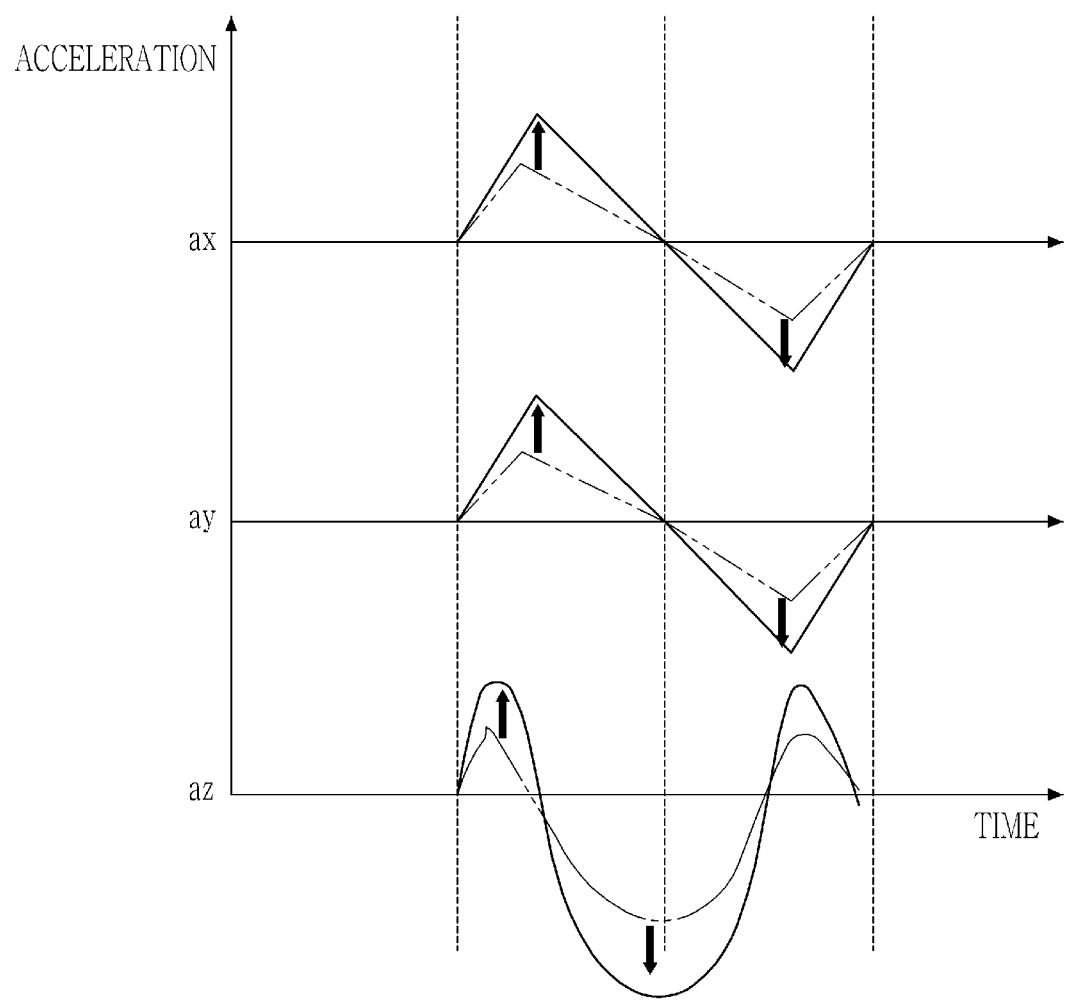
FIG. 2 is a graph illustrating ideal output signal characteristics of a 3-axis acceleration sensor mounted within the tire in the x-axis, y-axis and z-axis directions.

FIG. 2 is a graph illustrating ideal output signal characteristics of the 3-axis acceleration sensor mounted within the tire in the x-axis, y-axis and z-axis directions.

In FIG. 2, ax represents a longitudinal acceleration output signal in the x-axis direction, ay represents a transversal acceleration output signal in the y-axis direction, and az represents a vertical acceleration output signal in the z-axis direction.

Now, ideal output characteristics of the longitudinal acceleration output signal ax in the x-axis direction will be described. As shown in FIG. 2, the longitudinal acceleration output signal ax when a part of the tire 10 where the acceleration sensor 20 is mounted contacts a road surface is represented as a positive (+) component, and the longitudinal acceleration output signal ax when the part of the tire 10 where the acceleration sensor 20 is mounted is separated from the road surface is represented as a negative (−) component. Here, as longitudinal force Fx is applied to the tire 10, the value of the longitudinal acceleration output signal ax increases. That is, when longitudinal force Fx is applied to the tire 10, the graph of FIG. 2 illustrating the longitudinal acceleration output signal ax moves in the direction of the arrows.

Further, ideal output characteristics of the transversal acceleration output signal ay in the y-axis direction will be described. As shown in FIG. 2, the transversal acceleration output signal ay when the part of the tire 10 where the acceleration sensor 20 is mounted contacts the road surface is represented as a positive (+) component, and the transversal acceleration output signal ay when the part of the tire 10 where the acceleration sensor 20 is mounted is separated from the road surface is represented as a negative (−) component. Here, as transversal force Fy is applied to the tire 10, the value of the transversal acceleration output signal ay increases. That is, when transversal force Fy is applied to the tire 10, the graph of FIG. 2 illustrating the transversal acceleration output signal ay moves in the direction of the arrows.

Further, ideal output characteristics of the vertical acceleration output signal az in the z-axis direction will be described. As shown in FIG. 2, the vertical acceleration output signal az when the part of the tire 10 where the acceleration sensor 20 is mounted contacts the road surface and the vertical acceleration output signal az when the part of the tire 10 where the acceleration sensor 20 is mounted is separated from the road surface have a positive (+) peak value, and the vertical acceleration output signal az in a section between a point of time when the part of the tire 10 where the acceleration sensor 20 is mounted contacts the road surface and a point of time when the part of the tire 10 where the acceleration sensor 20 is mounted is separated from the road surface has a negative (−) peak value. Here, as vertical force Fz is applied to the tire 10, the value of the vertical acceleration output signal az increases. That is, when vertical force Fz is applied to the tire 10, the graph of FIG. 2 illustrating the vertical acceleration output signal az moves in the direction of the arrows.

FIGS. 3(a) to 3(c) are views illustrating a method of setting valid sections of x-axis and y-axis output signals using characteristics of the z-axis output signal of the 3-axis acceleration sensor mounted within the tire.

As described above, the ideal output signal characteristics of the 3-axis acceleration sensor 20 mounted within the tire 10 in the x-axis, y-axis and z-axis directions have graph shapes shown in FIG. 2.

Figure 3:
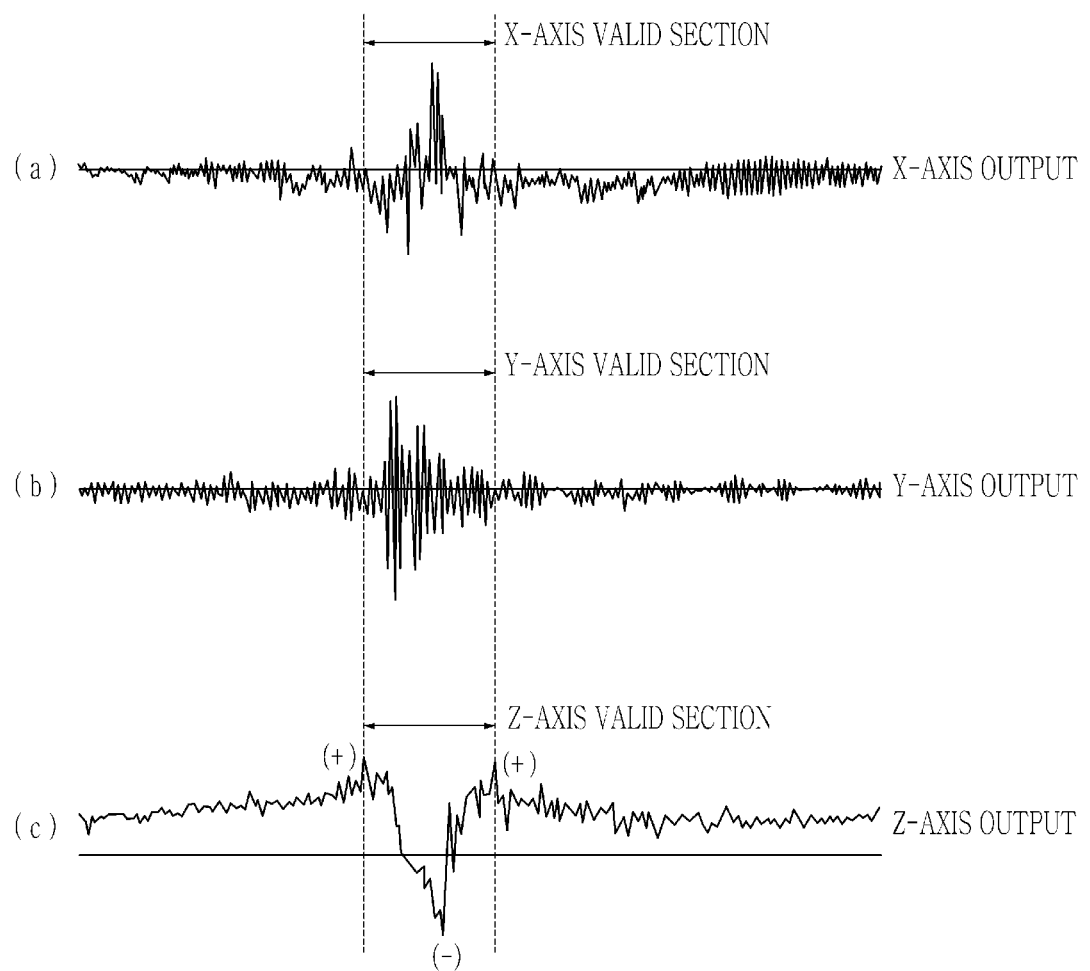
FIGS. 3(a) to 3(c) are views illustrating a method of setting valid sections of x-axis and y-axis output signals using characteristics of the z-axis output signal of the 3-axis acceleration sensor mounted within the tire.

However, when a test using the 3-axis acceleration sensor 20 is actually carried out, a severe noise component, as shown in FIG. 3, is added to the output signal of the 3-axis acceleration sensor 20 in each of the x-axis, y-axis and z-axis directions, and thus it may be difficult to judge tendency of the output signals in the x-axis, y-axis and z-axis directions. Particularly, since a severe noise component is added to the output signals in the x-axis and y-axis direction if transversal force is applied to the tire 10 and to the output signal in the y-axis direction if longitudinal force is applied to the tire 10, it may be difficult to detect valid output sections of the 3-axis acceleration sensor 20 using only the respective output characteristics of the 3-axis acceleration sensor 20 in the x-axis, y-axis and z-axis directions, as described above.

Therefore, one embodiment of the present invention proposes a method of setting valid sections of output signals in the x-axis and y-axis directions based on output in the z-axis direction.

With reference to FIG. 3, it is understood that output signal characteristics in the z-axis direction are remarkable, as compared to output signal characteristics in the x-axis and y-axis directions.

Using these characteristics, the 3-axis acceleration sensor 20 sets a section of the output signal in the z-axis direction represented by a positive (+) peak value→a negative (−) peak value→a positive (+) peak value of the output signal in the z-axis direction as a valid section where the part of the tire 10 where the acceleration sensor 20 is mounted contacts the road surface, sets a section of the output signal in the x-axis direction and a section of the output signal in the y-axis direction corresponding to the section of the output signal in the z-axis direction represented by the positive (+) peak value→the negative (−) peak value→the positive (+) peak value as valid sections in the x-axis and y-axis directions, and processes only the signals of the set valid sections in the x-axis, y-axis and z-axis directions to detect information between the tire 10 and the ground surface.

In accordance with the embodiment of the present invention, the 3-axis acceleration sensor 20 sets the section of the output signal in the z-axis direction represented by the positive (+) peak value→the negative (−) peak value→the positive (+) peak value of the output signal in the z-axis direction as the valid section where the part of the tire 10 where the acceleration sensor 20 is mounted contacts the road surface, and sets the section of the output signal in the x-axis direction and the section of the output signal in the y-axis direction corresponding to the valid section of in the z-axis direction as the valid sections in the x-axis and y-axis directions, thereby minimizing a component of a noise section.

Further, although the embodiment of the present invention exemplarily illustrates the 3-axis acceleration sensor, the above-described method may be applied to an acceleration sensor including an axis in the vertical direction (the x-axis and z-axis/the y-axis and z-axis) to set valid sections of output signals in the x-axis and y-axis directions based on an output signal in the z-axis direction.

As is apparent from the above description, a method of setting valid output sections of a 2-axis acceleration sensor or a 3-axis acceleration sensor in accordance with the present invention sets precise valid sections applied to detect information between a tire and a ground surface so as to minimize a component of a noise section by connecting output signals in the x-axis, y-axis and z-axis directions.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of setting valid output sections of a 3-axis acceleration sensor mounted within a tire of a vehicle to measure accelerations in x-axis, y-axis and z-axis directions, comprising:

setting an output signal of the 3-axis acceleration sensor in the z-axis direction as a reference signal, wherein the z-axis direction is perpendicular to a road surface;

setting a specific section of the output signal in the z-axis direction as a valid section where a part of the tire where the 3-axis acceleration sensor is mounted contacts the road surface; and setting sections of output signals of the 3-axis acceleration sensor in the x-axis and y-axis directions corresponding to the valid section in the z-axis direction as valid sections in the x-axis and y-axis directions, wherein the specific section of the output signal in the z-axis direction is a section where a positive (+) peak value, a negative (−) peak value, and a positive (+) peak value of the output signal in the z-axis direction are represented.

2. The method according to claim 1, further comprising detecting information of the tire and the road surface by processing the output signals only in the set valid sections in the x-axis, y-axis, and the z-axis directions.

3. A method of setting valid output sections of a 2-axis acceleration sensor mounted within a tire of a vehicle to measure accelerations in x-axis and z-axis directions, comprising:

setting an output signal of the 2-axis acceleration sensor in the z-axis direction as a reference signal, wherein the z-axis direction is perpendicular to a road surface;

setting a specific section of the output signal in the z-axis direction as a valid section where a part of the tire where the 2-axis acceleration sensor is mounted contacts the road surface; and setting a section of an output signal of the 2-axis acceleration sensor in the x-axis direction corresponding to the valid section in the z-axis direction as a valid section in the x-axis direction, wherein the specific section of the output signal in the z-axis direction is a section where a positive (+) peak value, a negative (−) peak value, and a positive (+) peak value of the output signal in the z-axis direction are represented.

4. The method according to claim 3, further comprising detecting information of the tire and the road surface by processing signals only in the set valid sections in the x-axis and z-axis directions.

* * * * *